Nov. 18, 1930.  A. BLECHA  1,781,972
CULTIVATOR HITCH
Filed June 18, 1929  3 Sheets-Sheet 2
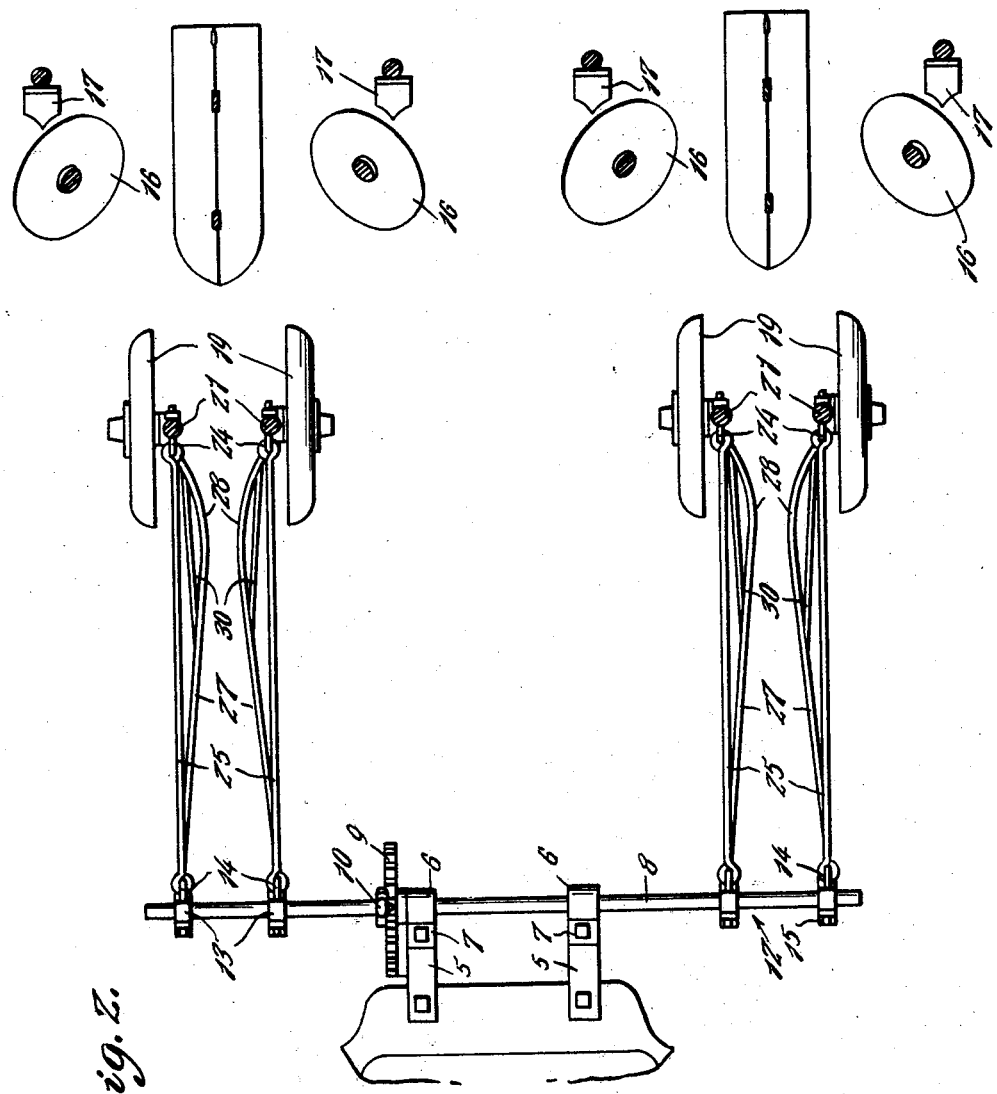

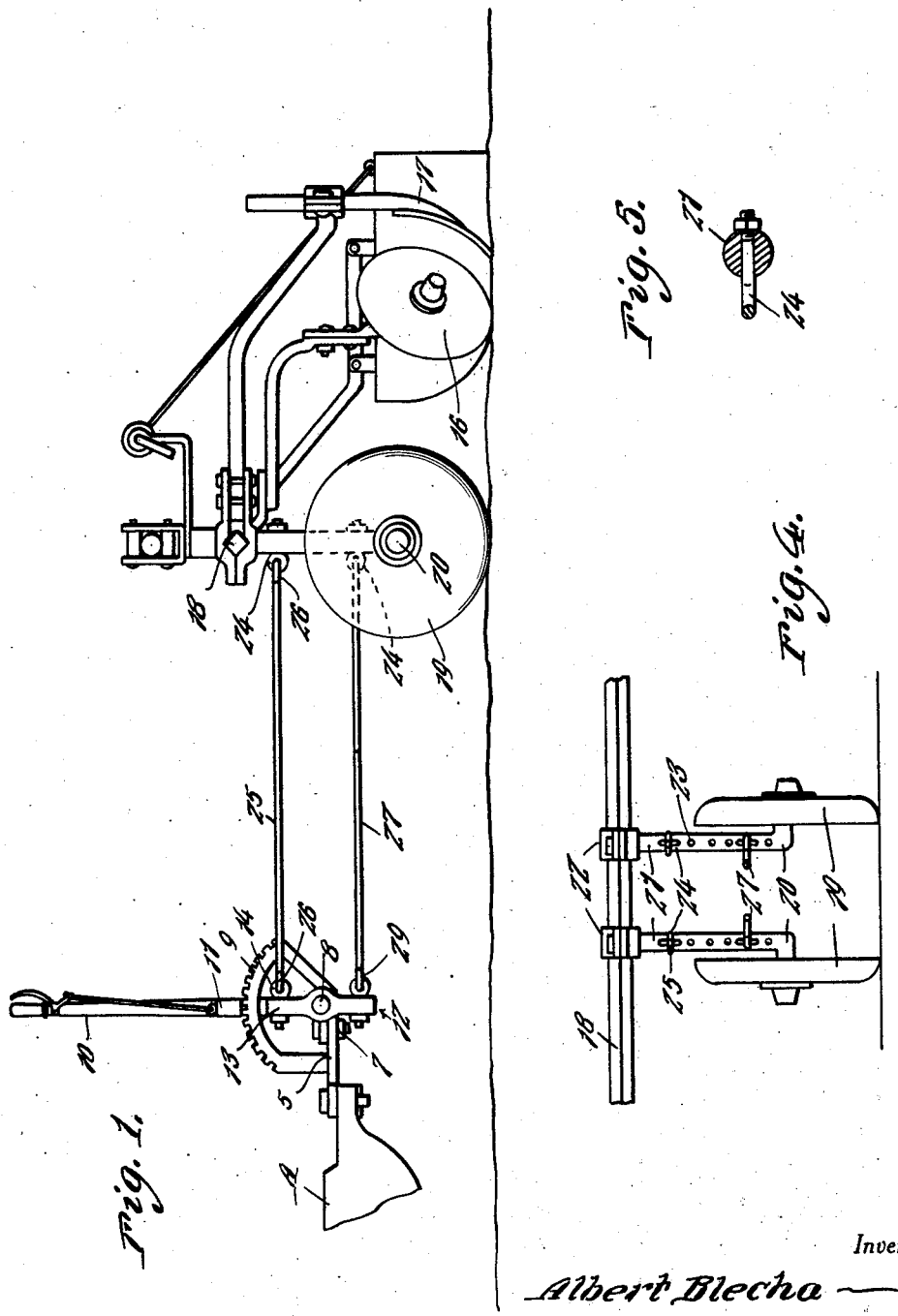

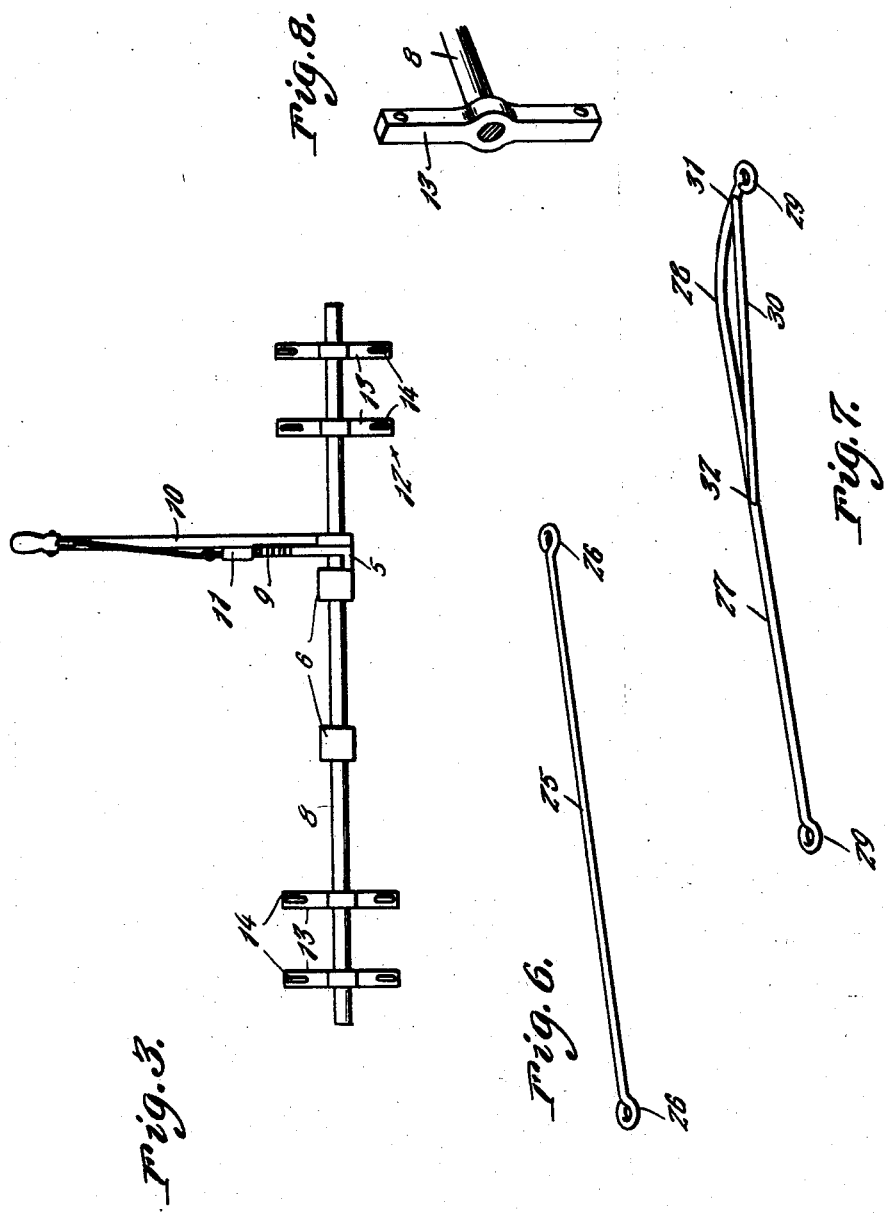

Patented Nov. 18, 1930

1,781,972

UNITED STATES PATENT OFFICE

ALBERT BLECHA, OF BENKELMAN, NEBRASKA

CULTIVATOR HITCH

Application filed June 18, 1929. Serial No. 371,818.

This invention appertains to new and useful improvements in hitches for cultivators and the same has as its principal object the provision of a novel hitch when in use will prevent teetering of the cultivator while in operation.

Another important object of the invention is to provide a hitch that will permit the adjusting of the cultivator at any vertical or horizontal angular disposition with respect to the ground or with respect to the longitudinal axis of the pulling tractor.

These and other important objects of the invention will become more apparent to the reader after considering the invention as described and claimed hereinafter.

In the drawings:

Figure 1 represents a side elevation of the improved hitch shown interposed between a cultivator and the draw bar of a tractor.

Figure 2 represents a horizontal sectional view through the hitch device and the cultivator mechanism.

Figure 3 represents a side elevation of the control means with the connector rod removed.

Figure 4 represents a side elevation of the adjustable frame for the gauge wheels.

Figure 5 represents a sectional view through one of the gauge wheel mounts and through an eye member attached thereto.

Figures 6 and 7 are perspective views of the upper and lower connecting rods.

Figure 8 represents a fragmentary vertical section and perspective view of the control for actuating the cultivator mechanism.

Referring to the drawings, wherein like numerals designate like parts, it will be seen in the drawings that A designates the tail piece of any tractor of ordinary construction and from this tail piece projects a pair of straps 5—5, which are looped at their outer ends as denoted by numeral 6 and secured as at 7 to provide a clamp means for an elongated shaft 8, which projects a substantial distance, at its ends beyond the sides of the tail piece A.

Projecting upwardly and suitably secured to one of the sides 5 is a segmental rack 9, while secured to the shaft 8 in close proximity to the rack 9 is a lever 10, provided with a detent 11 mounted thereon for engagement with the rack 9.

At the ends of the shaft 8 are cranks 12—12, each of which is constructed of upwardly and downwardly extending bars 13, each enlarged at its intermediacy and provided with an opening at this point to receive the shaft 8 and whereto it is firmly secured so that the crank will swing with the movement of the shaft. Each end of each bar 13 is provided with an opening through which the shank portion of an eye bolt 14 is disposed and secured by a nut 15.

As is clearly shown in Figure 1, the lifters 16, shovels 17 and other implements of a conventional cultivator mechanism are connected to a polygonal shaped bar 18, substantially as long as the shaft 8. A pair of gauge wheels 19—19 are mounted on the stub axle 20 of vertical posts 21—21 and a pair of these posts are secured adjustably at each end portion of the bar 18. Each of the posts 21 is provided at its upper end with a sectional clamp structure 22, whereby the gauge wheels may be adjusted with respect to each other. Each of the posts is provided with a plurality of vertically spaced openings, and a pair of eye bolts 24—24 may be adjusted on each post 21, by being interchanged, from disposition within certain openings to disposition through other openings in the same post.

Connecting the upper eye bolts of the crank 12 to corresponding eye bolts 24 of the post 21 are the connecting rods 25, each provided with an eye at each end for engagement with the eyes 14 and 24.

The corresponding lower eye bolts 14 and 24 of the crank 12 and post 21 are connected by connecting members 27. The connecting members 27 are each in the form of an elongated rod curved at its rear end portion as at 28 and provided with an eye 29 at each end. A brace member 30 is connected at one end by soldering, welding or the like to one end of the rod 27, as at 31, while its opposite end is secured to the intermediacy of the rod 27 as at 32. Thus, the lower connecting members are reinforced to strengthen the hitch.

It will thus be seen that the present improvement in elevator hitches will result in a more desirable uniformity of action on the part of tractor drawn elevators equipped with this improvement, especially those that are employed by gauge wheels driven by the furrows. The improvement will eliminate teetering which causes a disalignment of the machine and results in poor work. The improved hitch lacks many disadvantages found in the more rigid types of hitches, and while the foregoing description has been in specific terms, it has been understood that numerous changes in the specific shape, size and materials may be resorted to, without departing from the spirit and scope of the invention as claimed hereinafter.

What is claimed as new is:

1. A tractor hitch for cultivators comprising a shaft rotatably mounted at the rear of the tractor, means for rotating the shaft, upwardly and downwardly projecting members on the shaft, a gauge wheel mount, means for securing a cultivator to said mount, and link members connecting the said mount to the upwardly and downwardly extending members on the shaft.

2. A tractor hitch for cultivators comprising a shaft rotatably mounted at the rear of the tractor, means for rotating the shaft, upwardly and downwardly projecting members on the shaft, a gauge wheel mount, means for securing a cultivator to said mount, and link members connecting the said mount to the upwardly and downwardly extending members on the shaft, eye members at the free ends of the upwardly and downwardly extending members on the said shaft, and vertically adjustable eye members on the gauge wheel mount, said link members being provided with eyes at their ends for connection with their aforementioned eyes.

3. A tractor hitch for cultivators comprising a shaft rotatably mounted at the rear of the tractor, upwardly and downwardly projecting members on the shaft, a gauge wheel mount, means for securing a cultivator to said mount, and link members connecting the said mounts to the upwardly and downwardly extending members on the shaft, eye members at the free ends of the upwardly and downwardly extending members on the said shaft, and vertically adjustable eye members on the gauge wheel mount, said link members being provided with eyes at their ends for connection with the aforementioned eyes, and a lever and segment for adjusting the said shaft.

4. A hitch for tractor drawn cultivators comprising a shaft rotatably mounted at the rear of the tractor, means whereby the shaft may be adjusted and secured, upwardly and downwardly extending members on the shaft provided with eyes at their ends, an elongated bar, gauge wheel mounts adjustable on said bar, said bar being adapted to have a cultivator rigidly connected thereto, and link connections between the ends of the upwardly and downwardly extending members on the shaft and the said wheel mounts.

In testimony whereof I affix my signature.

ALBERT BLECHA.